United States Patent [19]

Schapiro

[11] 4,209,545
[45] * Jun. 24, 1980

[54] INSTANTIZED BLEND OF CASEINATE AND SOYA PROTEIN

[76] Inventor: Abraham Schapiro, P.O. Box 548, Kentfield, Calif. 94904

[*] Notice: The portion of the term of this patent subsequent to Oct. 21, 1993, has been disclaimed.

[21] Appl. No.: 895,356

[22] Filed: Apr. 11, 1978

Related U.S. Application Data

[63] Continuation-in-part of Ser. No. 726,612, Sep. 27, 1976, abandoned, and a continuation-in-part of Ser. No. 430,230, Jan. 2, 1974, Pat. No. 3,988,511, and a continuation-in-part of Ser. No. 156,040, Jun. 23, 1971, abandoned.

[51] Int. Cl.² .......................... A23L 2/00; A23J 3/00; A23J 7/00
[52] U.S. Cl. ..................................... 426/580; 426/785; 426/584; 426/634; 426/590; 426/657; 426/662
[58] Field of Search .............. 426/580, 588, 656, 657, 426/590, 93, 453, 634, 285, 584; 476/662

[56] References Cited

U.S. PATENT DOCUMENTS

| | | | |
|---|---|---|---|
| 3,028,242 | 4/1962 | Hale et al. | 426/93 |
| 3,120,438 | 2/1964 | McIntire et al. | 426/285 |
| 3,268,335 | 8/1966 | Circle et al. | 426/634 |
| 3,728,127 | 4/1973 | Palmer | 426/580 X |
| 3,988,511 | 10/1976 | Schapiro | 426/580 |

*Primary Examiner*—David M. Naff
*Attorney, Agent, or Firm*—Edward B. Gregg

[57] ABSTRACT

An instantized blend of caseinate and soya protein is prepared by a method wherein soya protein is pre-instantized by blending with a surfactant such as lecithin, by an incremental process in which a small amount of the soya protein is blended with the surfactant and the balance of the soya protein is added in small increments and blended before the next increment is added; and the resulting pre-instantized soya protein is then blended with the caseinate by adding the latter to the soya protein in small increments with blending of each increment before the next increment is added.

3 Claims, No Drawings

INSTANTIZED BLEND OF CASEINATE AND SOYA PROTEIN

This application is a continuation-in-part of my co-pending applications as follows: Ser. No. 156,040, filed June 23, 1971 entitled "WATER DISPERSIBLE PROTEINS" (now abandoned); Ser. No. 430,230, filed Jan. 2, 1974 entitled "PREPARATION OF WATER DISPERSIBLE PROTEIN PRODUCTS" (now U.S. Pat. No. 3,988,511); and Ser. No. 726,612, filed Sept. 27, 1976 entitled "WATER DISPERSIBLE PROTEIN PRODUCTS HAVING A HIGH PROPORTION OF PROTEIN" (now abandoned).

This invention relates to an instantized protein product.

In my above-mentioned U.S. Pat. No. 3,988,511, there is described a process of instantizing a protein such as soya protein which is water insoluble and which is difficult to disperse in an aqueous medium to form a stable dispersion (an "instantized" product).

The term "instantizing" as used herein is intended to mean the process of converting a protein (for example soya bean protein) which is water insoluble and which is difficult to disperse in water, into a form which is readily dispersible in water or other aqueous medium such as milk. An instantized protein can be added to water or other aqueous medium such as milk and mixed with a moderate degree of stirring (e.g., hand stirring and without high speed mixing as in a blender and/or the application of heat) to form a stable suspension that does not settle out or separate.

The process of instantizing described in my above-mentioned patent starts with a small amount (i.e., small compared to the weight of final product) of a substrate which may be a carbohydrate such as a sugar (e.g., sucrose) but which preferably is a small amount (similarly defined) of the protein which is to be instantized. To this substrate is added a surfactant which is acceptable as a food ingredient, such as lecithin or any of those described hereinafter, and the two ingredients (substrate and surfactant) are blended together. To the resulting pre-mix or core of substrate and surfactant is added a small quantity of the protein to be instantized and the resulting mixture again is blended. This process is repeated until the final product results. That is, the process is one of the incremental addition of a small quantity of the protein to be instantized to the blend or mixture resulting from the immediately preceding step, followed by thorough blending, and repetition until all of the protein that it is desired to instantize has been added.

Unless otherwise stated, where a product of the invention is described as having a specified (e.g., 95%) protein content, this refers to the commercial protein which itself may contain, for example, 5% of naturally occurring non-proteinaceous concomitants.

By this means a good instantized product results which, for example, can be added to water or milk at room temperature and stirred with ordinary hand stirring, as with a spoon, to produce a stable suspension which does not separate or stratify on standing. Among advantages of this process and product are the following: A high protein product containing very little (or no) added carbohydrate and containing very little surfactant can be produced. For example, a product containing 95 to 99.9 percent of protein, as little as 0.1 percent or less of surfactant and no carbohydrate can be produced.

I have found that this procedure and product are applicable with considerable advantage to the instantizing of mixtures of soya protein and one or more caseinates. (By "caseinate" is meant a sodium caseinate or a calcium caseinate or a mixture of the two in any proportions).

By this means, a very desirable food product is produced which can be mixed with water or milk and stirred manually with no great amount of effort and at room temperatures, to produce an instantized product which is stable in the sense that phase separation does not occur to any substantial degree.

As specific examples of the method and product of the present invention, the following formulation and procedure are provided.

EXAMPLE 1

To make a 1,000 pound batch, 400 pounds of soya protein were blended with lecithin in accordance with the procedure of my U.S. Pat. No. 3,988,511. The soya protein was a product of Central Soya Co. known as Promine D, containing about 90% of protein as determined by nitrogen analysis. 25 pounds were added to 8 pounds of lecithin. [The lecithin was a product of Central Soya Co. known as 3 FUB (unbleached, 3x filtered.)] It contained about 65% phospholipids, the balance being naturally occurring vegetable oil, which is a natural and ordinary concomitant of commercial lecithin derived from soya beans. These two ingredients (soya protein and lecithin) were mixed in a ribbon blender to form a uniform mix or pre-blend. To this pre-blend were added 50 pounds of the soya protein and the mixture was blended. (This and subsequent blending steps were carried out in a larger ribbon blender.) The balance of the soya protein (except the last 25 pound increment) was added in increments of 50 pounds each, with blending at each stage.

EXAMPLE 2

To the instantized soya protein of Example 1 were added 400 pounds of a mixture of equal parts by weight of sodium and calcium caseinates. This mixture was a commercial product of Western Dairy Products of San Francisco, Cal. known as No. 60. This mixture, as is typical of sodium and calcium caseinates and mixtures of the two, is very difficult to instantize. This caseinate was added in 50 pound increments, with thorough blending after each increment, to the blend of soya protein and lecithin. The blender was operated constantly during and after each addition of an increment of caseinate.

By this means a thoroughly and easily instantized protein was produced which can be used as is. However, it was mixed with 150 pounds of whey powder (Foremost Dairy No. 35) which was also added in 50 pound increments with blending of each increment before adding the next increment.

This product can be mixed with milk, water, fruit juice and other aqueous media to produce a nutritious and pleasantly flavored beverage. It has the following composition:

| Ingredient | Wt. (lbs.) | % by Wt. (approx.) |
|---|---|---|
| Soya Protein | 400 | 40 |
| Caseinate (Na & Ca) | 400 | 40 |

| Ingredient | Wt. (lbs.) | % by Wt. (approx.) |
|---|---|---|
| Whey powder | 150 | 15 |
| Flavor, vitamins and other minor ingredients | 50 | 5 |
| Lecithin | 8 | 0.8 |
| TOTAL | 1,008 | |

In the preferred procedure a small portion of the soya protein is mixed with all of the surfactant to form a uniform blend of the surfactant and the soya protein which will form easily broken lumps on squeezing by hand; then to the resulting concentrate, core or starter is added a further small increment of the soya protein and mixing is continued until, again, a uniform blend is achieved which is not powdery or dusty and which will form easily broken lumps on squeezing by hand; and this procedure is repeated until all of the soya protein has been added. If desired, the surfactant may be added in increments during the first few steps but preferably all of the surfactant is added to and blended with the first small increment of soya protein. The initial mixing steps, which employ relatively small quantities of material, may be carried out advantageously in equipment of suitably small size. A ribbon blender is an advantageous type of equipment for this purpose. Such equipment is well known in the food processing industry. It employs a helical screw which mixes and moves the ingredients and it may have a double helical screw which moves the mixture back-and-forth.

It is permissible to use continuous techniques in which, after a concentrate, core or starter has been formed, protein is added continuously, but the incremental procedure described above is preferred.

The surfactant employed may be a natural product, such as lecithin or it may be a synthetic product. It may be nonionic, anionic or cationic, provided it is non-toxic and is soluble in a fatty oil. Examples of suitable surface-active agents are as follows: lecithin, hydroxylated lecithins, refined phospholipids, polyoxyethylene sorbitan fatty acid esters, sorbitan esters of fatty acids, propylene glycol monolaurate and monostearate, glycerol monostearate and mono-oleate, safflower monoglycerides, polyoxyethylene, nonyl phenol adducts, diethylene glycol monolaurate and mono-oleate; polyethylene glycol mono- and di-laurates, stearates and oleates; polyoxyethylene ethers; coconut, lauric and stearic diethanolamides; phosphotidyl choline mono- and di-glycerides, inositol phosphatides, cephalin fractions, sodium stearoyl-2-lactylate, di-octyl sodium sulfosucinate, di-acetyl sodium sulfosuccinate and, of course, mixture of such surfactants.

The preferred surface-active agent is lecithin or a lecithin fraction. It is a natural product derived from such sources as soya bean and it is an approved food additive. As produced commercially, it contains an oil (soyabean oil when derived from soybean) which provides the oily base that is desirable in the practice of the present invention. With other surface-active agents which are synthetic and dry, it is desirable to dissolve them in oil, and even with those which are liquid it may be desirable to dissolve them in oil, e.g., to provide a 1 to 50% solution in an oil such as vegetable oil, e.g., coconut oil, cottonseed oil, cocoa butter, sesame oil, etc. Volatile solvents such as alcohol and ether may be employed but nonvolatile oils are preferred because they do not require evaporation.

The surfactant is used in sufficient quantity (which may be only 0.8, 0.5 or 0.1 percent or less based on final product) to instantize the protein blend. More may be used for dietary reasons but in most cases it is preferred to use a very small amount, e.g., 0.1 to 2%.

The proportions of instantized soya protein (such as described in Example 1) to caseinate (such as described in Example 2) may vary widely, e.g., 2 to 98 parts by weight of soya protein and 98 to 2 parts by weight of caseinate. Preferably the proportions are about 25 to 75 parts of soya protein and about 75 to 25 parts of caseinate. The ratio of sodium to calcium caseinate may also vary widely, e.g., from 100% of sodium caseinate to 100% of calcium caseinate. Preferably the proportions are about 25 to 75 parts by weight of one such caseinate to about 75 to 25 parts by weight of the other caseinate.

The following examples will serve further to exemplify the practice of my invention:

EXAMPLE 3.

To prepare a 1,000 pound batch, 400 pounds of instantized soya protein prepared as in Example 1 (containing 8 pounds of lecithin) were mixed with 400 pounds of sodium/calcium caseinate (same as in Example 2) by adding the caseinate in 50 pound increments with thorough blending of each increment with the material to which it was added before the next increment was added. Then 170 pounds of whey powder were added in increments not exceeding 50 pounds with thorough blending of each increment before adding the next increment. (The entire quantity of whey powder may be added at once but incremental addition is preferred.)

To the resulting blend were added a balanced mixture of amino acids resulting from hydrolysis of proteins, enzymes, flavor and egg powder, the quantity of each such ingredient being quite small but sufficient to bring the total weight to 1,000 pounds and to provide a good dietary balance which is instantized and capable of dispersing in aqueous media such as fruit juices.

EXAMPLE 4.

In this instance, equal parts by weight of instantized soya protein (same as in Example 1) and sodium/calcium caseinate (same as in Example 2) were mixed by the same procedure as in Example 2. Then an equal part by weight (i.e., equal to the weight of soya protein) of fructose was added, in this instance all at once rather than in increments, the addition of fructose taking place while the blender was operating. Various ingredients were added including corn bran flour, rice bran flour and soya bean flour in such proportions that for 25 pounds each of soya protein, caseinate and fructose the mixture contained 7, 5 and 1.5 parts by weight of corn, rice, and soya bran flour, respectively. Also 4 parts by weight (same basis) of cellulose fiber were added. Also egg albumen, a vitamin-mineral mix, flavors, an anti-caking agent (a silica product) and a thickening agent (xanthan gum) were added in small amounts. These ingredients can be added in various orders to the protein-fructose mixture in a blender.

Each of the products of Examples 1 to 4 can be added to a beverage such as a fruit juice and, when so added, it will disperse uniformly and stably with only gentle stirring and little or no phase separation occurring.

It will therefore be apparent that new and useful instantized food preparations have been provided.

I claim:

1. A method of instantizing a caseinate selected from the group consisting of sodium caseinate, calcium caseinate and mixtures of the two which comprises providing an instantized soya protein which is substantially free from added carbohydrate and which contains a surfactant as the instantizing agent, said instantized soya protein being the product of blending the surfactant with a small amount compared with the total amount of soya protein in the final instantized protein, of a substrate selected from the class consisting of soya protein and a sugar, and then adding soya protein to the substrate-surfactant blend in small increments until the total amount of soya protein has been added and blending each increment of soya protein with the previous blend of soya protein and substrate-surfactant blend before adding the next increment, then mixing the caseinate with the instantized soya protein by adding the caseinate in small increments until the total amount of caseinate has been added to the instantized soya protein and blending each increment of caseinate with the previous blend of caseinate and instantized soya protein before adding the next increment, the proportions of soya protein and caseinate being between about 25 and 75 parts by weight of caseinate to 75 to 25 parts by weight of soya protein.

2. The method of claim 1 wherein the surfactant is lecithin.

3. The method of claim 2 wherein the lecithin is present in an amount not exceeding about 1 percent of the weight of the final blend.

* * * * *